(12) United States Patent
Jakobsson

(10) Patent No.: US 6,317,833 B1
(45) Date of Patent: Nov. 13, 2001

(54) PRACTICAL MIX-BASED ELECTION SCHEME

(75) Inventor: Bjorn Markus Jakobsson, Hoboken, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/197,799

(22) Filed: Nov. 23, 1998

(51) Int. Cl.[7] ................... H04L 9/32; H04L 9/30; G06F 17/60
(52) U.S. Cl. .............. 713/181; 713/176; 380/30; 380/47; 705/12
(58) Field of Search ................ 380/28, 30, 47, 380/279; 713/170, 176, 181; 705/12; 235/51, 56, 57

(56) References Cited

U.S. PATENT DOCUMENTS 5,682,430 * 10/1997 Kilian et al. .................... 380/30
6,021,200 * 2/2000 Fischer ............................ 380/23
6,081,793 * 6/2000 Challener et al. ............... 705/50

* cited by examiner

Primary Examiner—Thomas R. Peeso
Assistant Examiner—Jurtin T. Darrow
(74) Attorney, Agent, or Firm—Henry T. Brendzel

(57) ABSTRACT

In an improved election process, a voter constructs his or her vote message (potentially padded with a random string) and encrypts it. The voter then signs the encrypted vote and posts the signed, encrypted, vote on a bulletin board. After the voting booths have closed, a set of talliers decrypt the encrypted votes with the aid of the mix network, to obtain the final tally, but without revealing or being able to notice the relationship between votes cast and votes in the tally.

33 Claims, 1 Drawing Sheet

PRACTICAL MIX-BASED ELECTION SCHEME

BACKGROUND OF THE INVENTION

This invention relates to encryption and, more particularly, to voting arrangements that employ encryptions and decryptions.

The last few years have seen a large number of election schemes being proposed, introducing an array of attractive features, but often with an increasing degree of complexity in terms of computation and communication. There are two main approaches in proposed voting schemes. In the first, employing mix networks, votes are encrypted with the public key of a mix network, the encrypted votes are submitted to a distributed authority which decrypts the encrypted votes while it permutes them. Consequently, in the straight application of the mix network privacy is maintained as to who voted which way. In this approach robustness typically does not come easy, or at the price of lost privacy, because the talliers cannot prove that the correct computation was performed without revealing the permutation used. This is, of course, a major drawback in a setting where both privacy and correctness are paramount. It is easier to obtain robustness (without sacrificing privacy) for schemes of a second type, exemplified by the teachings of J. Cohen, M. Fischer, "A robust and verifiable cryptographically secure election scheme," FOCS '85, pp. 372–382; R. Cramer, R. Gennaro, B. Schoenmakers, "A Secure and Optimally Efficient Multi-Authority Election Scheme," Eurocrypt '97, pp. 103–118; R.

Cramer, M. Franklin, B. Schoenmakers, M. Yung, "Multi-Authority Secret-Ballot Elections with Linear Work," Eurocrypt '96, pp. 72–83; among others. These schemes, however, impose restrictions on the format of votes (typically limited to binary votes) and are more cumbersome to the voters, as they have to employ zero-knowledge proofs to prove that their votes are of a valid format.

Recently, an improved mix network has been disclosed in my copending application titled "Improved Mix Network," which was filed in the U.S. Patent Office on Jan. 13, 1998, and bearing the Ser. No. 09/005,920, U.S. Pat. No. 6,048,613.

SUMMARY OF THE INVENTION

Influenced by methods used in both of the-above described types of schemes, and utilizing the benefits of a recently disclosed, improved, mix network, this invention combines the advantage s of the prior art approaches, but avoids their disadvantages.

A voter constructs his or her vote message (potentially padded with a random string) and simply encrypts it, using ElGamal encryption, or a related scheme. The voter then signs the encrypted vote and posts the signed, encrypted, vote on a bulletin board. After the voting period has ended, a set of talliers decrypt the encrypted votes with the aid of the mix network, to obtain the final tally, but without revealing or being able to notice the relationship between votes cast and votes in the tally.

The election scheme of this invention allows votes of arbitrary length to be cast, while at the same time simplifying the vote casting process. Additionally, while voters still have to trust that at least one of the participating talliers is honest, it is still an improvement over existing art, which still needs some authority to correctly certify registered voters; and the honesty of this authority seems like a much stronger trust assumption. Of course, in this scheme as well as in the other schemes, there is a certification authority that effectively indicates who is authorized to vote.

DETAILED DESCRIPTION

Figure 1:
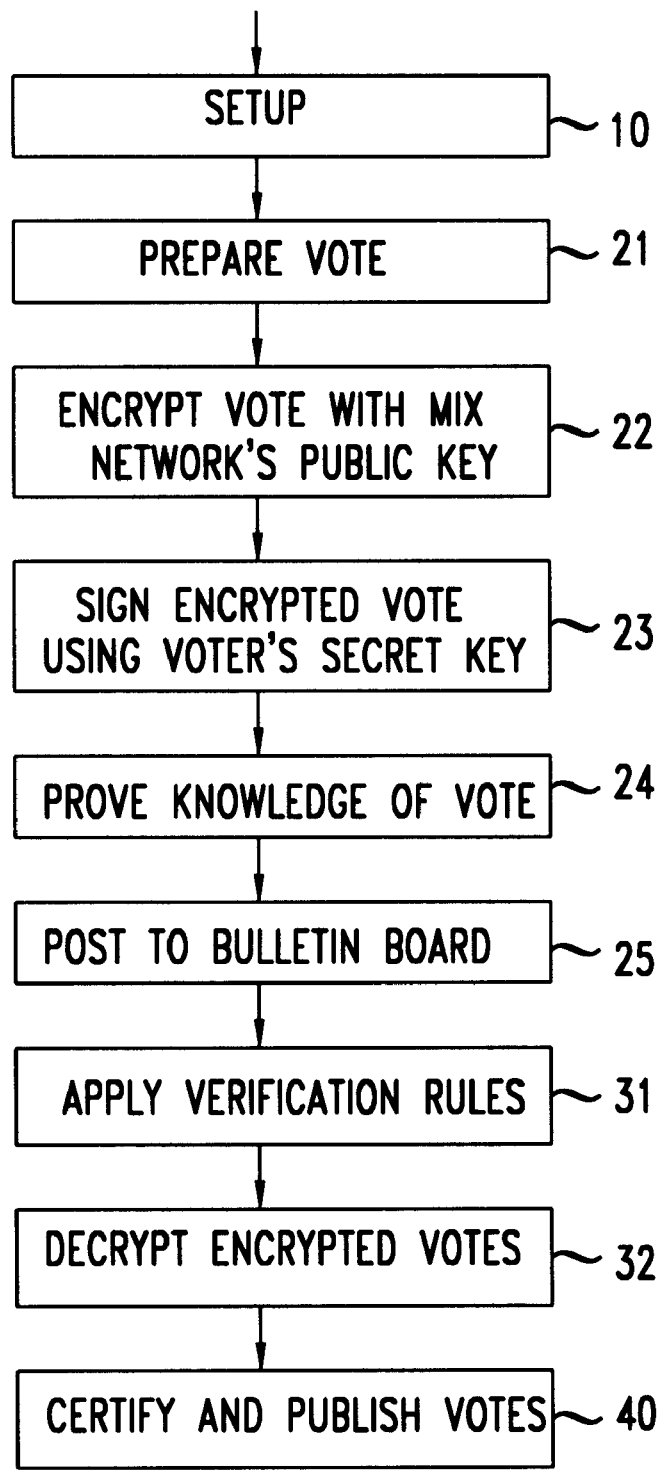
FIG. 1 presents a flow chart of the voting process disclosed herein.

The disclosed election scheme aims to allow non-binary votes to be cast. A vote can be of any length agreed upon, and the disclosed scheme accepts such votes without affecting the efficiency of the arrangement (assuming votes of less than a few hundred bits, which seems like an vast overkill for any reasonable setting). The disclosed election scheme also allows incorrect votes to be easily weeded out. (Other schemes, in contrast, force voters to prove that their cast votes are valid before these are accepted, since incorrect votes cannot be removed after having been accepted.)

At the core of the improved characteristics of the disclosed election scheme use of a mix network, which was disclosed in the aforementioned application. A mix network is a network that permit a collection of encrypted messages to be permuted and re-encrypted, blinded, or decrypted by a collection of entities, in such a way that no true subset of the entities can determine the relation between a given output and the inputs. Thus, using a mix network allows the disclosed method to robustly decrypt and permute a vector of (ElGamal) encrypted messages, without revealing to voters or the protocol participants (the talliers) themselves the correspondence between entries in the input and output vectors. The implementation is efficient for reasonably large vectors. The resulting large-scale election protocol remains efficient while combining an increased functionality (e.g., multi-bit votes) with a simpler design (e.g., the elimination of distribution of a vote among talliers and of zero-knowledge proofs of compliance with the accepted vote formats.) FIG. 1 presents a flow chart of the election scheme disclosed herein. The scheme has four phases that can be characterized as setup, casting a vote, tallying the votes, and verifying the result. The setup-phase only needs to be done once, independent of the number of forthcoming elections. In the second phase, eligible and certified voters cast their votes. Talliers start tallying the votes at some publicly known time, constituting phase three. Once the third phase has started, no more votes are accepted. After the completion of the tallying, the results can be read.

1. Setup (Block 10)

(a) It is assumed that all eligible voters have a pair of secret and public keys associated with them. Each pair is different and only the voter in question knows his/her secret key. The public keys are either recorded in a list of all eligible voters, or certified by a Certifying Authority.

(b) The talliers share a secret key x using a (k, n) threshold scheme as described, for example, by A. Shamir, "How to Share a Secret," *Communications of the ACM,* Col. 22, 1979, pp. 612–613, and by T. Petersen, "Distributed Provers with Applications to Undeniable Signatures," *Eurocrypt '93,* pp. 221–242. Corresponding to this secret key there is a public key $y=g^x \mod p$, where g is a generator less than p, and p is a prime number such that $p=lq+1$, where q is also a prime, and l is an integer.

2. Casting a Vote

In order to cast a vote, the voter performs the following steps:

(a) Block 21: Each voter prepares a valid vote, v, which may have any non-zero value (including the blank vote) that is describable by ldigits, where $2^l \leq q$. The voter may also append a random padding to the vote, thus including an unpredictable portion to vote v. This allows the voter to later recognize his vote in the tally. Of course, there may be valid reasons for not revealing the random padding in the published tally.

(b) Block 22: Each voter encrypts his/her vote v, using ElGamal encryption with public key y and randomly selected temporary secret α, yielding a pair (vy$^α$ mod p, g$^α$ mod p). The string (vy$^α$ mod p, g$^α$ mod p) can be decrypted by the mix network, using the public key y and its counterpart x, where y=g$^x$ mod p, without knowing the temporary secret, α.

(c) Block 23: The voter signs this encrypted vote using the voter's secret key SK, and a randomly generated temporary secret k1, in one of the manners reviewed and described by Bruce Schneier in "Applied Cryptography," J. Wiley and Sons, Inc., Second Edition, p. 487. This operation yields a signature (r,s) on the encrypted vote. One can prove that the voter in possession of the secret key SK signed the message.

(d) Block 24: The voter proves knowledge of the cast vote. This can be done by signing the encrypted and signed vote using a as a secret key, and g$^α$ mod p as the public key. That is, the voter generates the signature (r1, s1) and appends it to (vy$^α$ mod p,g$^α$ mod p,r,s). One can prove that the message was signed by a person who knows what a is, and since that is the temporary secret key that was employed to generated vy$^α$ mod p, it must be the person who performed the original encryption in block 22.

(e) Block 25: The voter delivers the (twice) signed encrypted vote to a collection point, such as an bulletin board, along with the certificate on his public key, if certification is the approach taken.

3. Tallying the Votes (Block 30)

(a) Block 31: At the end of the voting period (after which no more votes are accepted, and only the talliers can write to the bulletin board), the talliers calculate the tally from the cast votes. In block 31 the talliers verify that each message corresponding to a cast vote is correctly signed, that the corresponding public keys are certified by the certification authority (if certification is the approach employed), and that each particular voter's public key was only used to sign one message. Any message that does not conform to this is weeded out. If desirable to have another party perform subsequent steps, the verified and weeded-out collection of votes can be forwarded to that other party, together with a certification. With respect to the process of weeding out encrypted votes that call for use of a public key more than once, various approaches can be taken. One system might keep only the first vote, another system might keep only the last vote, still another system might keep none of the votes, etc.

(b) Block 32: Following certification, a mixing and decryption operation is performed in block 32. The mixing aims to insure that a correspondence cannot be established between an encrypted vote and the decrypted vote (and certainly between a voting party and a decrypted vote). The decryption can then take place in a mix network as disclosed in my aforementioned copending application, the talliers decrypt the votes cast from their encrypted messages. The two operations (mixing and decryption) can be intermixed, and they could be done separately. When done separately, a certification step may be interposed between the mixing and the decryption, to allow different parties to perform the different operations.

4. Verifying the Results (Block 40)

The resulting votes are published, along with a signature of all the talliers on the tally. This can be performed in a variety of ways, as can be appreciated by a person skilled in the art. For example, the talliers can compute a so-called hash of the tally, and each would then sign his hash. Alternatively, they may construct a common signature on the hash, such that the public key of the signature is shared among them. This may be the same public key that is used for encryption, for which the corresponding secret shares are used to decrypt the votes. It may also be another shared public key.

The voters can obtain the result of the election by reading this output file; the signature on the list of valid, decrypted votes proves that a quorum of mix-servers approved the result.

I claim:

1. A method for generating a vote message comprising the steps of:

a voter encrypting a vote with a public key of an authority, using a temporary secret selected at random, forming an encrypted vote;

generating a signature on the encrypted vote using a secret key of said voter; and sending said encrypted vote and said signature for tallying.

2. The method of claim 1 where said authority performs mixing, decryption, and tallying of votes.

3. The method of claim 2 where said authority is distributed among independent entities.

4. The method of claim 2 where said authority employs a plurality of processors, each under control of an independent party.

5. A method for generating a vote message comprising the steps of:

a voter encrypting a vote with a public key of an authority, using a temporary secret selected at random;

generating a signature on the encrypted vote using a secret key of said voter; and sending the signed encrypted vote for tallying, where said step of generating a signature includes the steps of generating a first signature on the encrypted vote using a secret key of said voter;

generating a second signature that employs said temporary secret as a second secret key.

6. A method for generating a vote message comprising the steps of:

a voter encrypting a vote with a public key of an authority, using a temporary secret selected at random;

generating a signature on the encrypted vote using a secret key of said voter; and sending the signed encrypted vote for tallying, where said authority performs mixing of encrypted votes.

7. The method of claim 6 where said authority performs decryption of mixed encrypted votes.

8. A method for voting comprising the steps of:

a voter encrypting a vote with a public key of an authority, using a temporary secret selected at random;

generating a signature on the encrypted vote using a secret key of said voter;

sending the encrypted vote and the signature for tallying;

collecting the sent encrypted vote with encrypted votes sent by other voters;

verifying signatures associated with said collected encrypted votes;

removing encrypted votes that violate prescribed rules, to form a weeded-out set of encrypted votes;

mixing said weeded-out set of encrypted votes to form a mixed set; and decrypting said mixed set of encrypted votes to yield a set of decrypted votes.

9. The method of claim 8 where said step of generating a signature comprises the steps of:
generating a first signature on the encrypted vote using a secret key of said voter; and
generating a second signature that employs said temporary secret as a second secret key.

10. The method of claim 8 where said step of decrypting is performed by said authority.

11. The method of claim 8 where said step of decrypting is performed by said authority and said step of mixing is performed by other than said authority.

12. The method of claim 8 where said authority comprises a plurality of entities that are independent of each other.

13. The method of claim 8 where said authority is distributed among independent parties.

14. The method of claim 8 where said rules include the rule that signatures of encrypted votes must verify.

15. The method of claim 8 where said rules include the rule that not more than one vote may be admitted for each allowed public key that is associated with a voter's private key.

16. The method of claim 8 where said step of removing, when faced with a violation where more than one vote calls for use of a given public key that is associated with a secret key of a voter, removes all of the encrypted votes that call for use of said public key.

17. The method of claim 8 where said step of removing, when faced with a violation where more than one vote calls for use of a given public key that is associated with a secret key of a voter, removes all but the first of the encrypted votes that call for use of said public key.

18. The method of claim 8 where said step of removing, when faced with a violation where more than one vote calls for use of a given public key that is associated with a secret key of a voter, removes all but the last of the encrypted votes that call for use of said public key.

19. The method of claim 8 further comprising a step of certifying said set of decrypted votes.

20. The method of claim 8 further comprising a step, interposed between said step of mixing and said step of decrypting, a step of generating a certification of said weeded-out set of encrypted votes, and sending said certification and said weeded-out set of encrypted votes to said authority.

21. The method of claim 8 further comprising a step, interposed between said step of removing and said step of mixing and decrypting, a step of generating a certification of said weeded-out set of encrypted votes, and sending said certification and said weeded-out set of encrypted votes to said authority.

22. A method for tallying votes comprising the steps of:
collecting encrypted votes;
verifying signatures associated with said collected encrypted votes;
removing encrypted votes that violate prescribed rules, to form a weeded-out set of encrypted votes;
mixing said weeded-out set of encrypted votes to form a mixed set; and
decrypting said mixed set to yield a set of decrypted votes.

23. The method of claim 22 where said steps of mixing and decrypting are performed by two different entities.

24. The method of claim 22 where said step of decrypting is performed by a decryption authority.

25. The method of claim 24 where said authority is distributed among a plurality of independent entities.

26. The method of claim 22 wherein said step of verifying includes a step of removing encrypted votes whose signatures do not verify.

27. The of claim 22 further comprising a step, interposed between said step of mixing and said step of decrypting, a step of generating a certification of said weeded-out set of encrypted votes, and sending said certification and said weeded-out set of encrypted votes to said authority.

28. The method of claim 22 further comprising a step, interposed between said step of removing and said step of mixing, a step of generating a certification of said weeded-out set of encrypted votes, and sending said certification and said weeded-out set of encrypted votes to said authority.

29. The method of claim 22 further comprising a step of certifying said set of decrypted votes.

30. The method of claim 22 where said rules include the rule that not more than one vote may be admitted for each allowed public key that is associated with a voter's private key.

31. The method of claim 22 where said step of removing, when faced with a violation where more than one vote calls for use of a given public key that is associated with a secret key of a voter, removes all of the encrypted votes that call for use of said public key.

32. The method of claim 22 where said step of removing, when faced with a violation where more than one vote calls for use of a given public key that is associated with a secret key of a voter, removes all but the first of the encrypted votes that call for use of said public key.

33. The method of claim 22 where said step of removing, when faced with a violation where more than one vote calls for use of a given public key that is associated with a secret key of a voter, removes all but the last of the encrypted votes that call for use of said public key.

\* \* \* \* \*